United States Patent
Zhu

(10) Patent No.: US 10,855,091 B1
(45) Date of Patent: Dec. 1, 2020

(54) DOCKING SYSTEM FOR SMART HOME APPARATUS

(71) Applicant: Shou Qiang Zhu, Ontario, CA (US)

(72) Inventor: Shou Qiang Zhu, Ontario, CA (US)

(\*) Notice: Subject to any disclaimer, the term of this patent is extended or adjusted under 35 U.S.C. 154(b) by 0 days.

(21) Appl. No.: 16/410,156

(22) Filed: May 13, 2019

(51) Int. Cl.
| | |
|---|---|
| *H05K 5/00* | (2006.01) |
| *H05K 7/00* | (2006.01) |
| *H02J 7/00* | (2006.01) |
| *H04L 12/28* | (2006.01) |
| *H01B 9/00* | (2006.01) |

(52) U.S. Cl.
CPC .......... *H02J 7/0044* (2013.01); *H01B 9/006* (2013.01); *H04L 12/2816* (2013.01); *H04L 2012/2841* (2013.01)

(58) Field of Classification Search
CPC .... G03B 17/02; G03B 7/26; G08B 13/19619; G08B 13/19656; G08B 13/1966; H01R 33/22; H04N 5/2251; H04N 5/2253; H04N 5/2257; H04W 84/12
See application file for complete search history.

(56) References Cited

U.S. PATENT DOCUMENTS

| | | | | |
|---|---|---|---|---|
| 6,018,452 | A * | 1/2000 | Meyerhoefer | H01T 4/06 361/111 |
| 8,404,971 | B1 * | 3/2013 | Gretz | H02G 3/123 174/481 |
| 9,423,672 | B1 * | 8/2016 | Kilgore | H04N 5/2251 |
| 2009/0308993 | A1 * | 12/2009 | Chang | F16B 47/00 248/176.3 |
| 2013/0270317 | A1 * | 10/2013 | Wang | B60R 11/02 224/570 |
| 2018/0191931 | A1 * | 7/2018 | Bly | H04N 5/2251 |
| 2019/0347916 | A1 * | 11/2019 | Wild | H04N 21/2747 |
| 2020/0001467 | A1 * | 1/2020 | Tsai | B25J 9/0009 |

\* cited by examiner

*Primary Examiner* — Yuriy Semenenko
(74) *Attorney, Agent, or Firm* — Che-Yang Chen; Law Office of Michael Chen

(57) ABSTRACT

In one aspect, an electronic apparatus may include a base and an electrode. In one embodiment, the electrode can be cylindrical with a threaded portion on top of the electrode, and the threaded portion can be used to secure another electronic device with corresponding threads. For example, the electrode can be used to connect with a camera having an electrode and a corresponding threaded portion. More specifically, the camera can be secured on the electrode through the threaded portions and when the camera is fully secured on the electrode, the electrode can be in contact with the electrode to electrically connect with the camera.

5 Claims, 5 Drawing Sheets

DOCKING SYSTEM FOR SMART HOME APPARATUS

FIELD OF THE INVENTION

The present invention relates to a docking system for smart home devices, and more particularly to an electrode connection method in which electrical connection is obtained by an electrode connection structure on the docking system.

BACKGROUND OF THE INVENTION

Some homes today are equipped with smart home networks to provide automated control of devices, appliances and systems, such as heating, ventilation, and air conditioning ("HVAC") systems, lighting systems, home theater and entertainment systems, as well as security systems. Smart home networks may include control panels that a person may use to input settings, preferences, and scheduling information that the smart home network uses to provide automated control of the various devices, appliances, and systems in the home.

In a smart home setting, people interact with a number of different electronic devices on a daily basis. For example, a person may interact with smart thermostats, lighting systems, alarm systems, entertainment systems, and a variety of other electronic devices. Unfortunately, the usefulness of these devices often times limited to basic and/or particular pre-determined tasks associated with the device, which causes inconvenience for the user to operate these devices. Therefore, there remains a need for a new and improved electronic devices especially in the home setting to overcome the problems presented above.

SUMMARY OF THE INVENTION

In one aspect, an electronic apparatus may include a base and an electrode. In one embodiment, the electrode can be cylindrical with a threaded portion on top of the electrode, and the threaded portion can be used to secure another electronic device with corresponding threads.

For example, the electrode can be used to connect with a camera having an electrode and a corresponding threaded portion. More specifically, the camera can be secured on the electrode through the threaded portions and when the camera is fully secured on the electrode, the electrode can be in contact with the electrode to electrically connect with the camera.

In one embodiment, the electronic apparatus may further include one or more lighting apparatus, so combining with the camera, the electronic apparatus can be a smart home device disposed at a front door of the house that can be used to take picture or videos through the camera and electrically transmitted through the electrical connection via the electrodes and wirelessly transmitted to the user end through WIFI, BLUETOOTH, etc.

It is important to note that the electrical connection of the electrode can be used to connect other electronic devices, as long as the electronic device being connected having a corresponding threaded portion and the electrode that can be in contact with the electrode to establish the electrical connection once the electronic device is fully secured on the electrode.

DETAILED DESCRIPTION OF THE INVENTION

Figure 1:
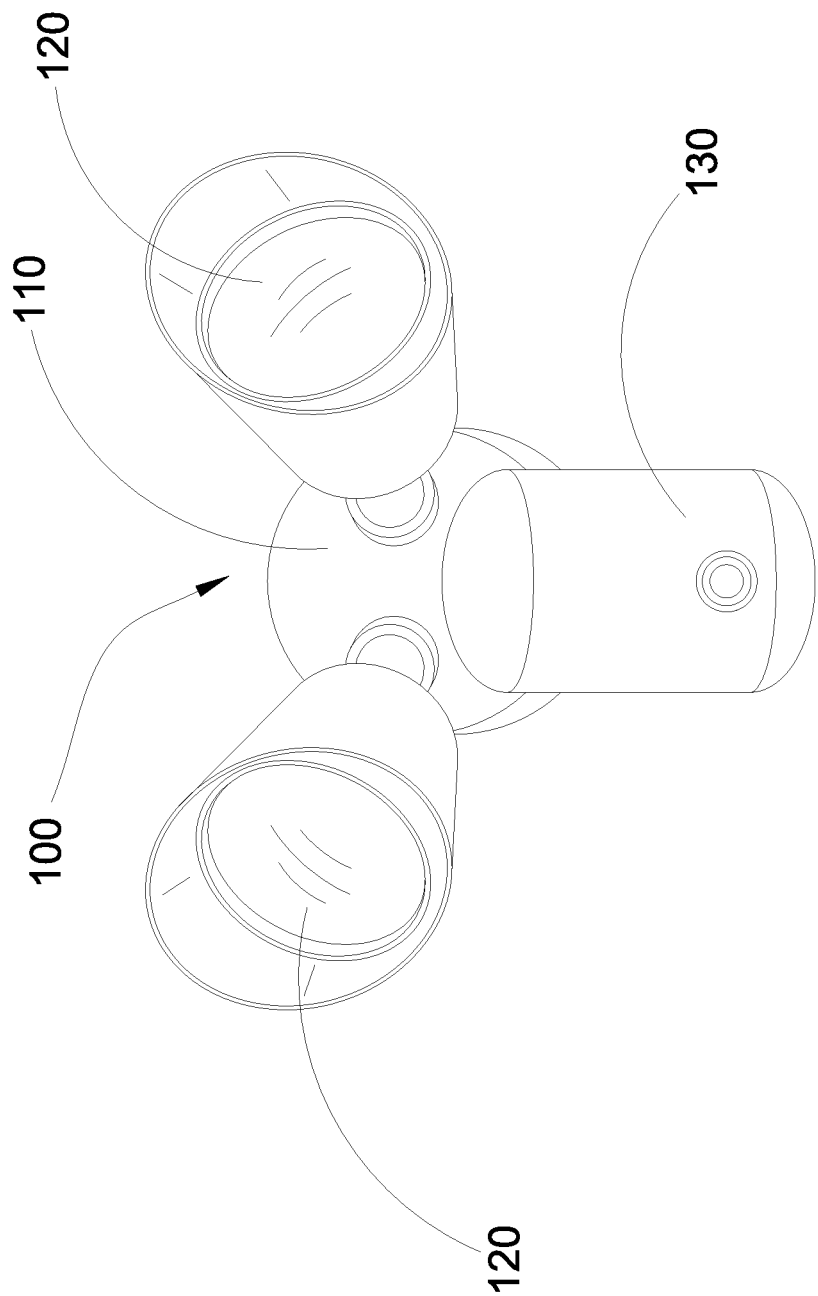
FIG. 1 is a schematic view of the electronic apparatus in the present invention.
Figure 2:
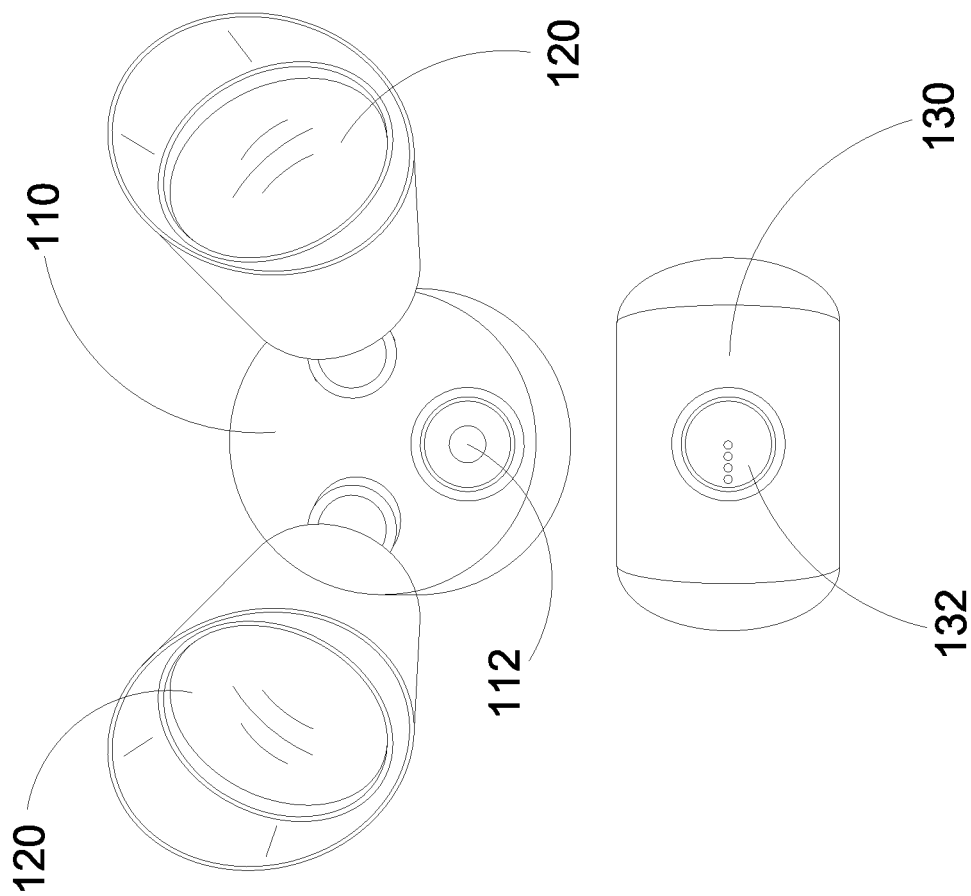
FIG. 2 illustrates a partial exploded view of the electronic apparatus in the present invention.
Figure 3:
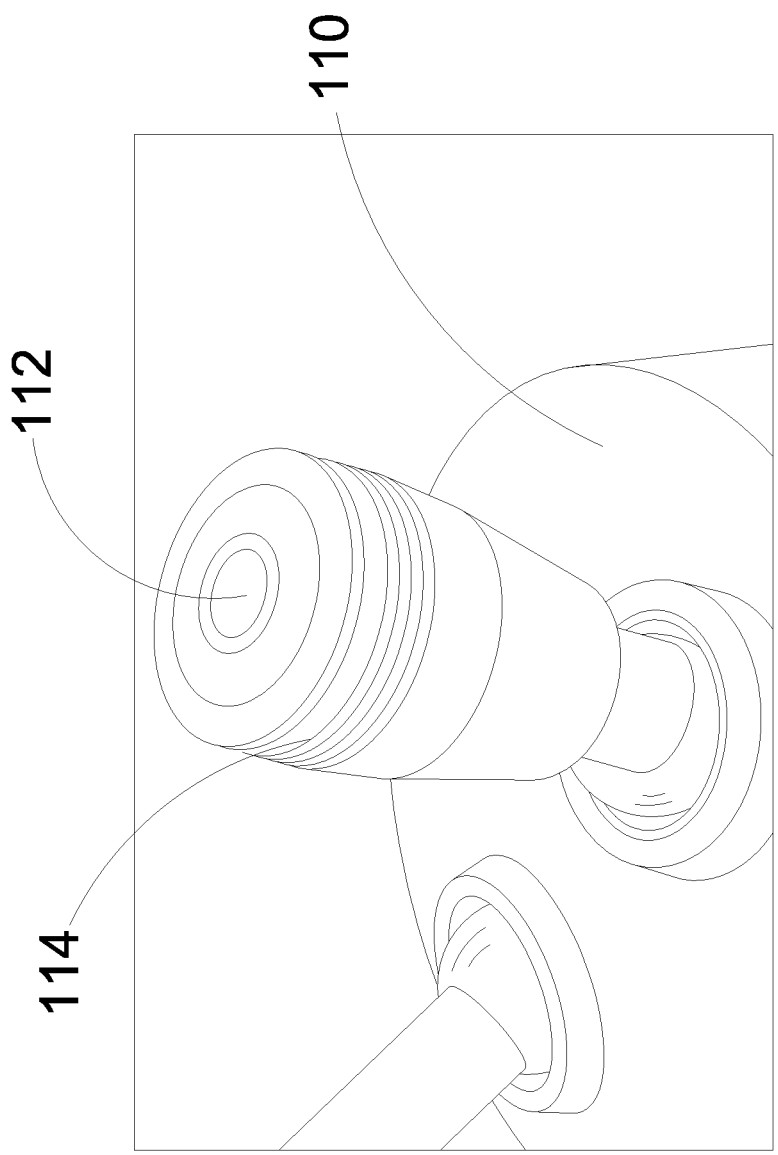
FIG. 3 illustrates a partial enlarged view of the electrode on the base of the electronic device in the present invention.
Figure 4:
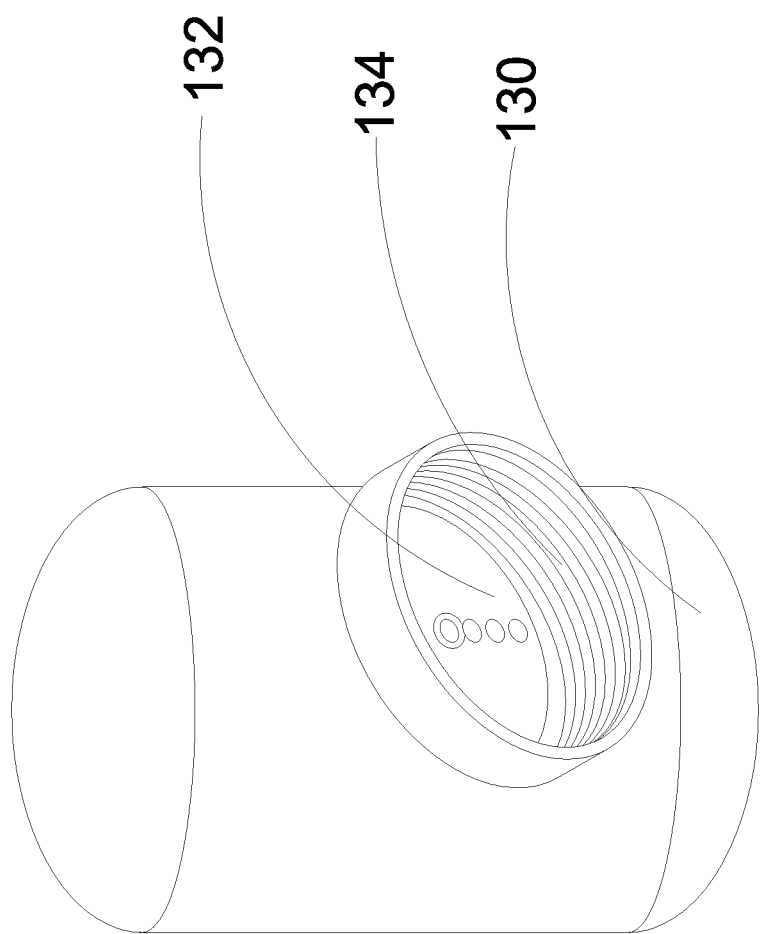
FIG. 4 illustrates a partial enlarged view of an electronic device connecting to the electrode through the threads in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In one aspect, as shown in FIGS. 1 to 4, an electronic apparatus 100 may include a base 110 and an electrode 112. In one embodiment, the electrode 112 can be cylindrical with a threaded portion 114 on top of the electrode 112, and the threaded portion 114 can be used to secure another electronic device with corresponding threads.

For example, the electrode 112 can be used to connect with a camera 130 having an electrode 132 and a corresponding threaded portion 134. More specifically, the camera 130 can be secured on the electrode 112 through the threaded portions 134 and 114 and when the camera 130 is fully secured on the electrode 112, the electrode 112 can be in contact with the electrode 132 to electrically connect with the camera 130.

In one embodiment, the electronic apparatus 100 may further include one or more lighting apparatus 120, so combining with the camera 130, the electronic apparatus 100 can be a smart home device disposed at a front door of the house that can be used to take picture or videos through the camera 130 and electrically transmitted through the electrical connection via the electrodes (112, 132) and wirelessly transmitted to the user end through WIFI, BLUETOOTH, etc.

Figure 5:
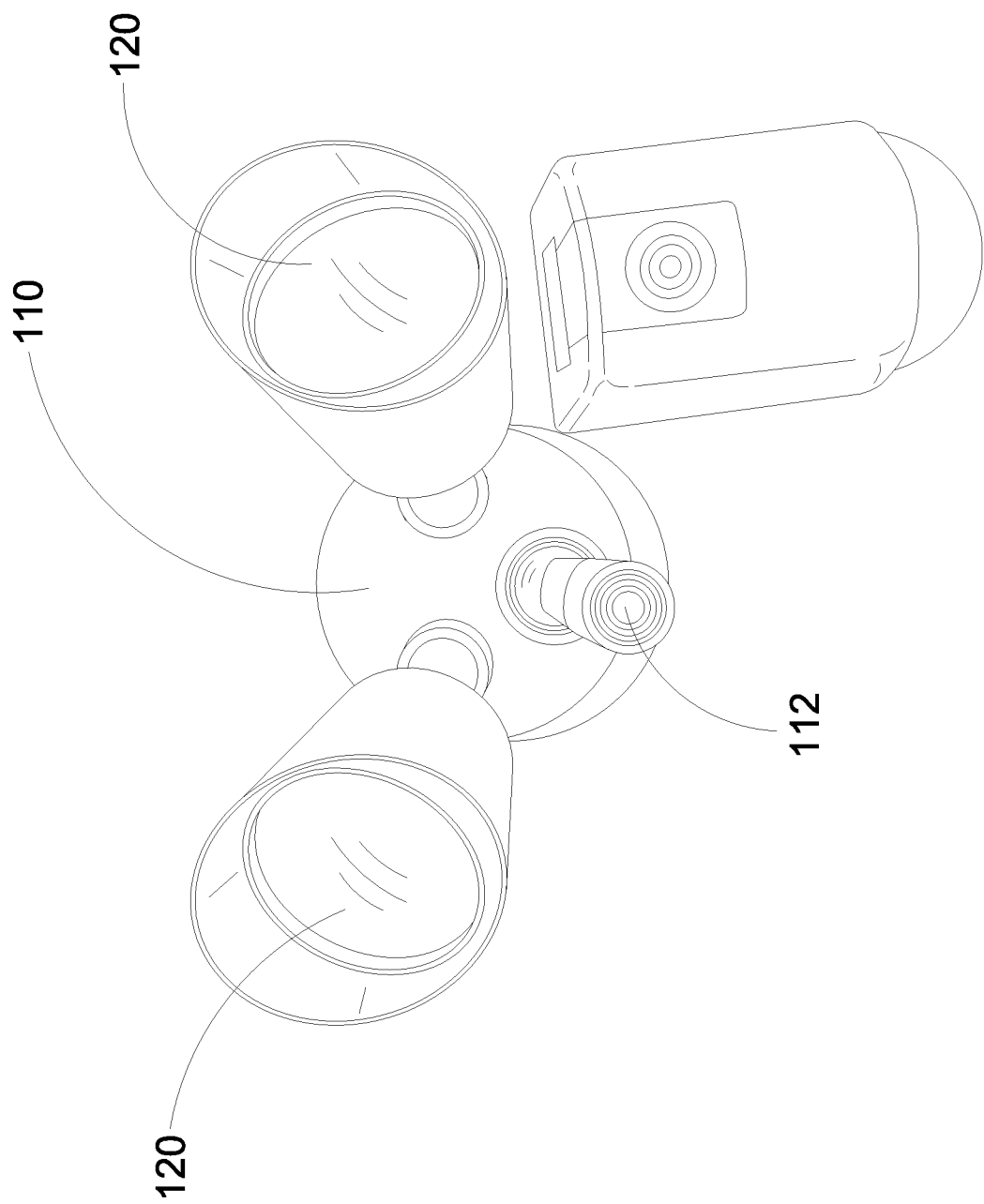
FIG. 5 is a schematic view of the electronic apparatus in the present invention configured to connect with another electronic device through the threads.

It is important to note that the electrical connection of the electrode 112 can be used to connect other electronic devices as shown in FIG. 5, as long as the electronic device being connected having a corresponding threaded portion and the electrode that can be in contact with the electrode 112 to establish the electrical connection once the electronic device is fully secured on the electrode 112.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. An electronic apparatus comprising a base and one or more apparatus electrodes electrically connected with the electronic apparatus, wherein the electrode is cylindrical with a threaded portion on top of the electrode, and the threaded portion is configured to secure an electronic device having a device electrode with corresponding threads and having a plurality of contacting dots configured to electrically connect with the apparatus electrode, so when the electronic device is secured on the apparatus electrode, the apparatus electrode and the contacting dots of the device electrode are in contact to electrically connect the electronic device with the electronic apparatus.

2. The electronic apparatus of claim 1, wherein the electronic apparatus is a home security system.

3. The electronic apparatus of claim 2, wherein the electronic device is a camera.

4. The electronic apparatus of claim 2, wherein the electronic device is a lighting fixture.

5. The electronic apparatus of claim 3, wherein the camera is configured to take pictures or videos which are configured to transmit to a user's electronic device through WIFI or BLUETOOTH.

* * * * *